Figure 1:
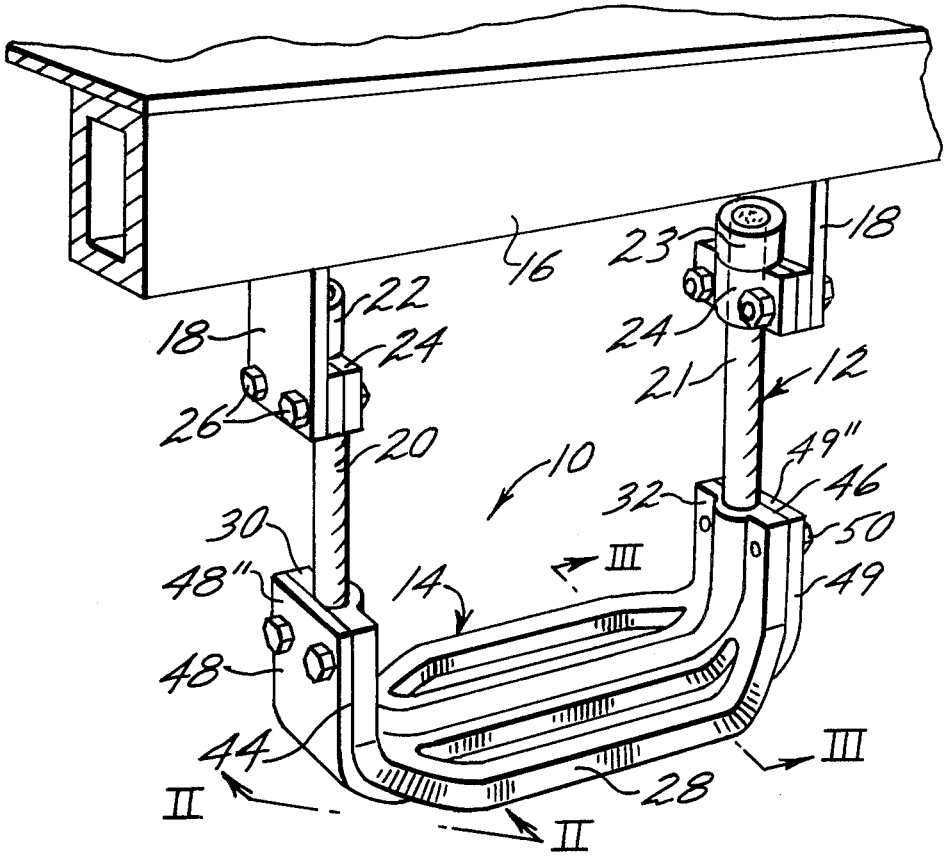
Figure 2:
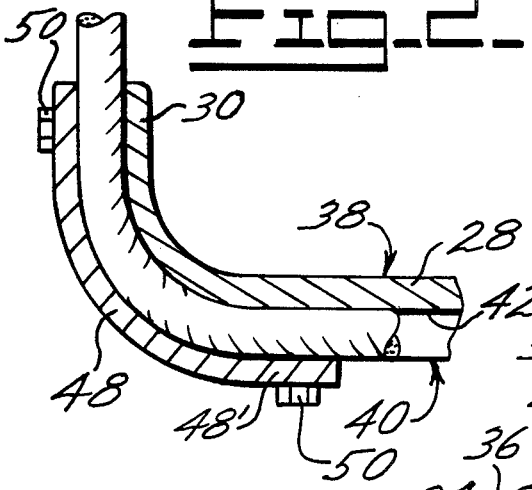
Figure 3:
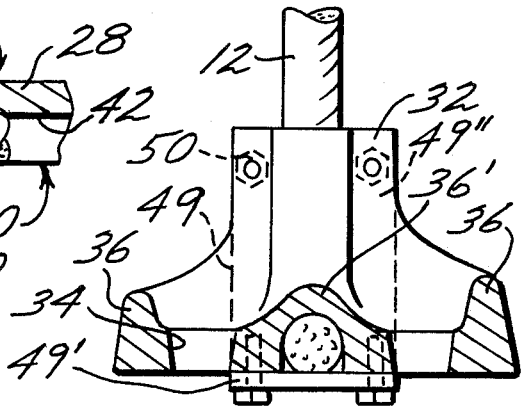

United States Defensive Publication [19] (H) [11] T977,005

Sidles, Jr. et al. [43] Dec. 5, 1978

[54] STEP ASSEMBLY FLEXIBLY MOUNTED

[76] Inventors: Peter Sidles, Jr., 31 Timberlake Trail, Oswego, Ill. 60543; Bernard J. Wulff, 1224 Johnston Dr., Aurora, Ill. 60506

[21] Appl. No.: 889,703

[22] Filed: Mar. 24, 1978

[51] Int. Cl.[2] ..... B60R 3/02

[52] U.S. Cl. ..... 280/163

[57] ABSTRACT

A step assembly for a vehicle includes a cable supported step member that has retaining elements which function to prevent rotation of the step about the cable.

1 Claim, 1 Sheet Drawing,

5 Pages Specification

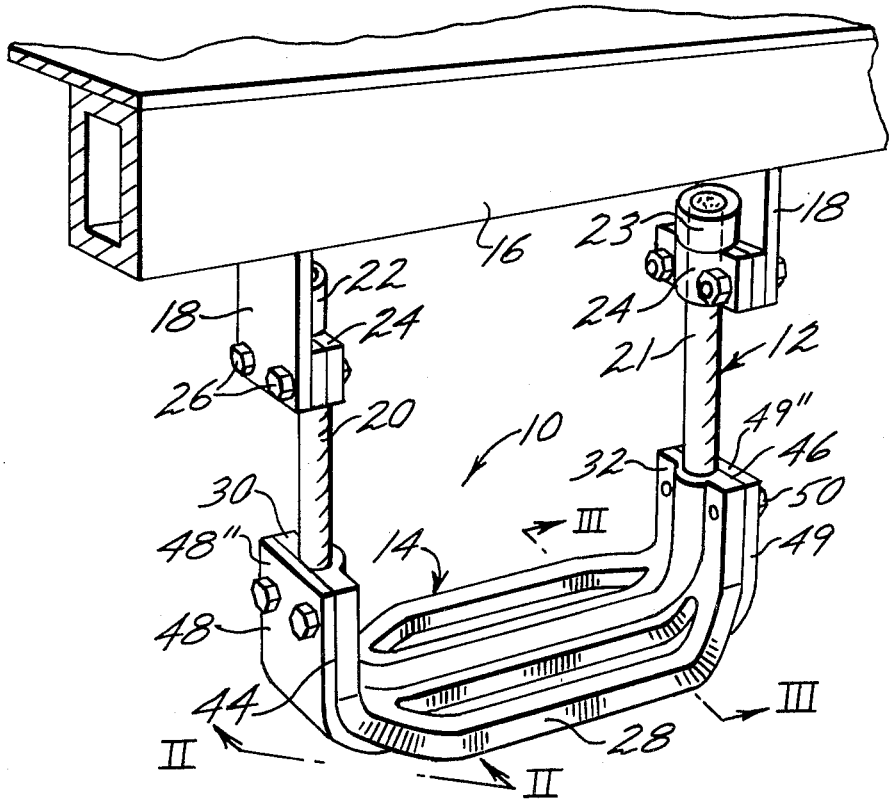

The file of this unexamined application may be inspected and copies thereof may be purchased (849 O.G. 1221, Apr. 9, 1968).